H. A. SCHNELBACH & H. A. HEUPEL.
GLASS BLOWING MACHINE.
APPLICATION FILED MAY 25, 1908.
929,330.
Patented July 27, 1909.
3 SHEETS—SHEET 2.
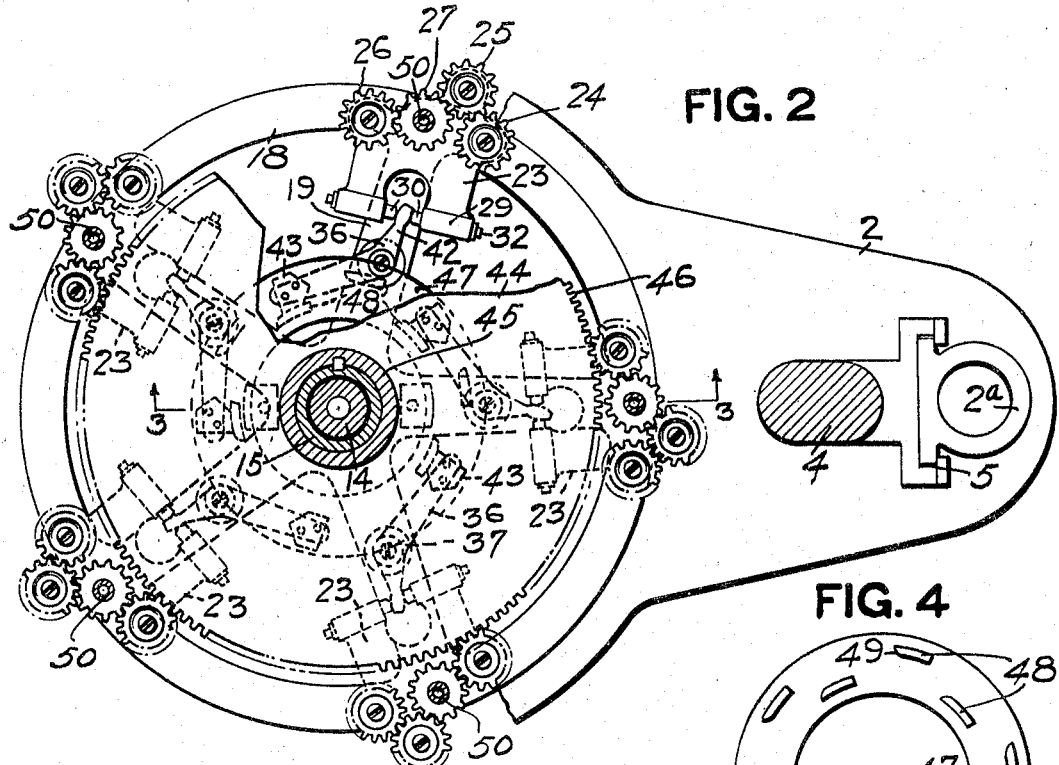
FIG. 2
FIG. 4
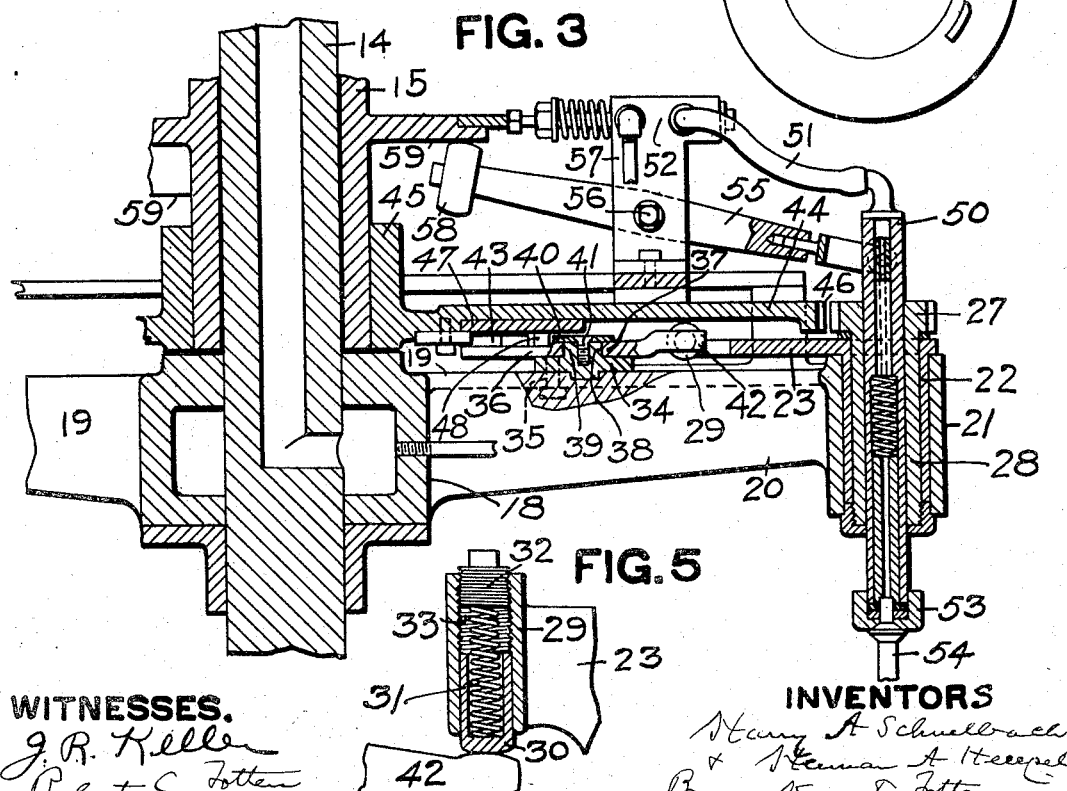
FIG. 3
FIG. 5
WITNESSES.
INVENTORS H. A. SCHNELBACH & H. A. HEUPEL.
GLASS BLOWING MACHINE.
APPLICATION FILED MAY 25, 1908.

929,330.

Patented July 27, 1909.

3 SHEETS—SHEET 3.

WITNESSES.

INVENTORS.

UNITED STATES PATENT OFFICE.

HARRY A. SCHNELBACH, OF CRAFTON, AND HERMAN A. HEUPEL, OF CHARLEROI, PENNSYLVANIA, ASSIGNORS TO MACBETH-EVANS GLASS COMPANY, OF PITTSBURG, PENNSYLVANIA, A CORPORATION OF PENNSYLVANIA.

GLASS-BLOWING MACHINE.

No. 929,330.      Specification of Letters Patent.      Patented July 27, 1909.

Application filed May 25, 1908. Serial No. 434,912.

*To all whom it may concern:*

Be it known that we, HARRY A. SCHNELBACH, a resident of Crafton, in the county of Allegheny and State of Pennsylvania, and HERMAN A. HEUPEL, a resident of Charleroi, county of Washington, State aforesaid, have invented a new and useful Improvement in Glass-Blowing Machines; and we do hereby declare the following to be a full, clear, and exact description thereof.

Our invention relates to glass blowing machines, its object being to provide a simple and efficient means for oscillating the blow pipes as they travel around a rotary frame, so as to prevent the twisting or distorting of the glass in the mold which sometimes is liable to occur where the blow pipe is rotated constantly in one direction.

Our invention comprises the novel features hereinafter set forth and claimed.

Figure 1:
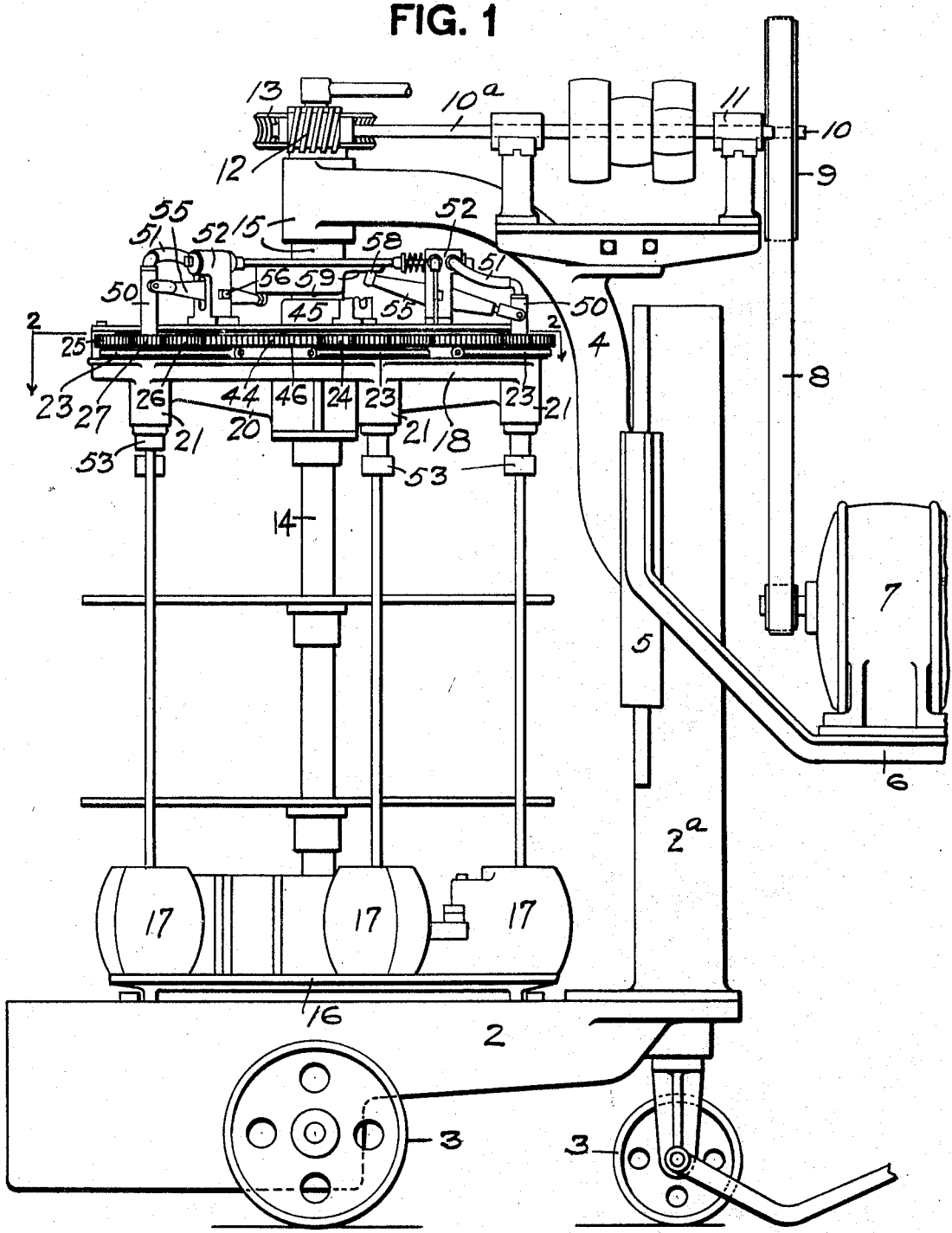
Figure 6:
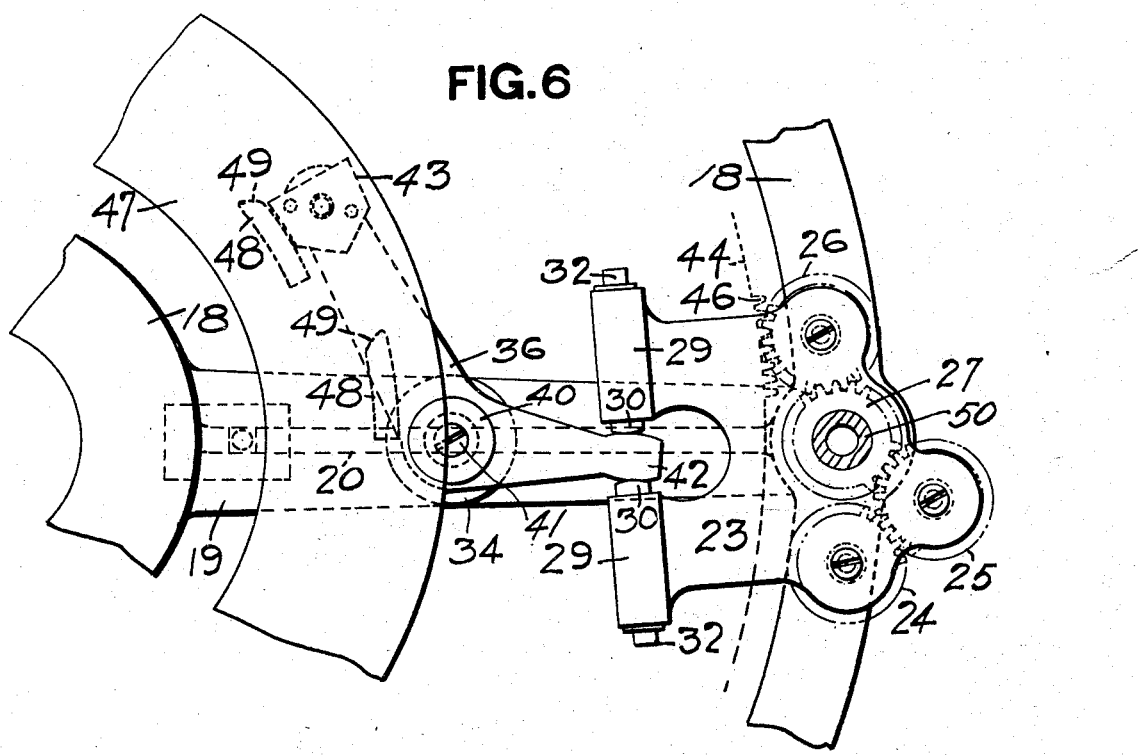
Figure 7:
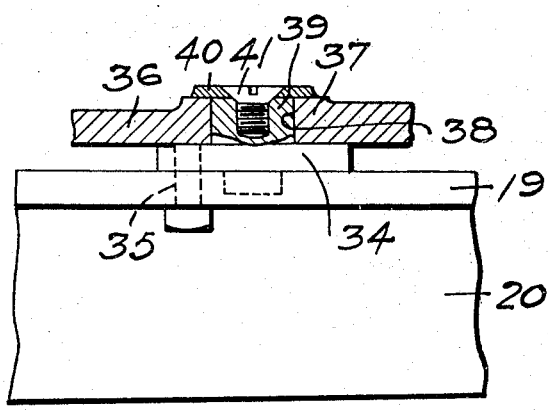
Figure 8:
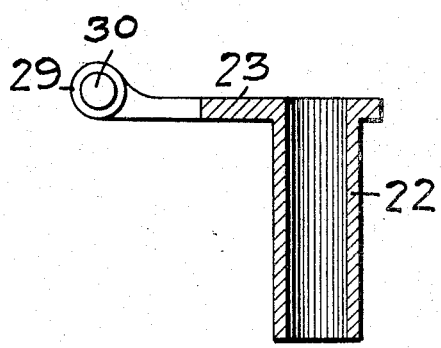

In the accompanying drawings Figure 1 is a side elevation of a glass blowing machine embodying our invention; Fig. 2 is a cross section on the line 2—2, Fig. 1; Fig. 3 is a section on the line 3—3, Fig. 2; Fig. 4 is a plan view of the cam ring removed; and Figs. 5, 6, 7 and 8 are enlarged details.

We have shown our invention applied to an ordinary form of glass blowing machine, and as the construction of the machine in itself forms no part of our invention we will only refer to the same in a general way.

The numeral 2 designates the base or support of the machine which may be mounted on wheels 3 for transporting the machine from one part of the factory to another. Supported on the base 2 is the pillar 2ª to which the frame 4 is secured, said frame being vertically adjustable in suitable guides 5 in the pillar 2ª. On the frame 4 is the shelf 6 which forms the support for a suitable electric motor 7. A belt 8 connects the motor shaft with the pulley 9 on the shaft 10 journaled in suitable bearings 11 on the frame. The shaft 10 is connected by a belt to a countershaft 10ª. Secured to the countershaft 10ª is the worm 12 which engages the worm wheel 13 on the vertical shaft 14. This shaft 14 is stepped at its lower end in the base 2 and said shaft at the upper end passes through the sleeve 15 on the frame 4.

A table 16 is secured to the shaft 14, said table carrying the molds 17 which are arranged at proper intervals around the outer edge of said table 16. Keyed to the shaft 14 is the spider 18 with the arms 19 extending radially therefrom with the downwardly extending ribs 20. At the outer ends of the arms 19 are the sleeves 21 and within said sleeves 21 are the bushings 22 connected to the brackets 23. The brackets 23 carry the idler gears 24, 25 and 26. The idler 24 meshes with the idler 25 and the idler 25 meshes with the gear wheel 27 on the rotary socket 28. The idler 26 meshes with the gear wheel 27.

The bracket 23 is provided with the sockets 29 and within said sockets are the hollow pins 30 and a spring 31 is located in said hollow pin 30, one end of said spring bearing against the outer end of said pin and the opposite end of said spring bearing against the nut 32 engaging the threaded portion 33 of the socket 29. This spring permits of a certain amount of play on the part of the pin 30 and said pin is permitted to yield when subjected to unusual pressure, as hereinafter set forth.

The arms 19 are provided with the bosses 34 secured thereto by means of the screws 35. Crank arms 36 have bosses 37 with the openings 38 which encircle the necks 39 of the bosses 34. Washers 40 are provided and screws 41 pass through countersunk openings in said washers and enter the threaded seats in the necks 39. This permits of the free oscillation of the crank arms 36 upon the arms 19. One end of the crank arm 36 is engaged by the hollow pins 30 and the opposite end of said crank carries the cam 43.

A stationary circular plate 44 has the sleeve 45 by means of which said plate is held in a fixed position upon the frame 4. This plate 44 has the teeth 46 formed in its periphery with which the idlers 24 and 26 are adapted to engage alternately. Secured to the lower face of the plate 44 is the ring 47 which is provided with the cam blocks 48 staggered with reference to each other and provided with the beveled ends 49. These cam blocks are in the path of the cams 43 and the cranks 36 are shifted by said cam blocks in the manner hereinafter set forth.

Extending down through the rotary sockets 28 are the pipes 50, said pipes being connected by flexible connections 51 to the air chambers 52 to which air is supplied in proper quantity. The sockets 53 on the lower ends of the pipes 50 are adapted to engage the upper ends of the blow pipes 54. The pipe 50 is vertically movable in the rotary socket 28 and to provide for this vertical movement of the pipe 50 in bringing the rotary sockets 28 into engagement with the blow pipes and releasing therefrom levers 55 are provided, said levers being journaled at 56 to the standard 57. The outer ends of the lever 55 have the friction wheels 58 thereon which are adapted to travel along the cam 59.

When our improved machine is in use the blow pipes with the molten glass on the ends thereof are inserted in the racks in such position as to bring the lower ends of the blow pipes into proper position with reference to the open mold, whereupon the mold is closed and the pipe 50 lowered automatically by means of the lever 55 working in connection with the cam 59. Blow pipes are arranged to be inserted at the front of the machine and while the machine is in operation and the table carrying the molds, as well as the spider 18, are in course of rotation. The mold, after being closed, moves around and rotary motion is imparted to the blow pipe from the idler 26 which is in engagement with the stationary gear plate 44 to the gear 27 on the rotary socket 28. The idler 26 is in mesh with the gear plate 44 while the cam 34 has its inner face in contact with one of the cam blocks 48. Just as soon, however, as the spider 18 rotates sufficiently to disengage said cam from the cam block, the cam 43 will come into engagement with one of the outer cam blocks 48, whereupon the crank arm will be moved so that the end 42 of the crank arm will bear against one of the hollow pins 30 and act to move the bracket 23 sufficiently to throw the idler 26 out of mesh with the gear plate 44 and throw the idler 24 into engagement with said plate. The idler 24 through the idler 25 meshing with the gear wheel 27 will impart an opposite rotary movement to the gear wheel 27, whereupon the direction of rotation of the blow pipe will be reversed. In case the gear wheel 24 when moved into engagement with the teeth of the gear plate 44 should not exactly mesh with said gear plate the spring 31 will permit the pin 30 to yield sufficiently to prevent any tearing or stripping of the gear teeth. In this manner, as the rotary frame travels around, the blow pipe is given an oscillatory movement and prevents the twisting or distorting of the glass in the mold and a perfect article is assured.

What we claim is:

1. In a glass blowing machine, the combination of a rotary frame, a mold and blow pipe carried thereby, means for rotating said frame, a gear wheel on said frame, connections between said gear wheel and the blow pipe, a movable frame, idler gears carried by said frame and meshing with said gear wheel, a circular gear rack, and means for automatically throwing said idlers alternately into engagement with said rack.

2. In a glass blowing machine, the combination of a rotary frame, a mold and blow pipe carried thereby, means for rotating said frame, a gear wheel on said frame, connections between said gear wheel and the blow pipe, a movable frame carried by said rotary frame, idlers on said movable frame meshing with said gear wheel, a circular rack, and means for throwing said idlers alternately into engagement with said rack.

3. In a glass blowing machine, the combination of a rotary frame, a mold and blow pipe carried thereby, means for rotating said frame, a gear wheel on said frame, connections between said gear wheel and the blow pipe, a movable frame on said rotary frame, idlers carried by said frame and meshing with said gear wheel, a circular rack, a crank arm carried by said rotary frame and engaging said movable frame, and means for operating said crank arm, whereby said idlers are alternately thrown into engagement with said circular rack.

4. In a glass blowing machine, the combination of a rotary frame, a mold and blow pipe carried thereby, means for rotating said frame, a gear wheel on said frame, a movable frame on said rotary frame, idlers on said movable frame meshing with said gear wheel, a circular rack plate, a crank arm, one arm thereof engaging said movable frame, and means carried by said circular rack plate, whereby said idlers are alternately thrown into engagement with the teeth of said rack plate.

5. In a glass blowing machine, the combination of a rotary frame, a mold and blow pipe carried thereby, means for rotating said frame, a gear wheel on said frame, a movable frame on said rotary frame, idlers on said movable frame meshing with said gear wheel, a crank, one arm of which engages said movable frame, a cam on the other arm of said crank, a circular rack plate, and cam blocks on said circular rack plate in the path of said cam, whereby said idlers are alternately thrown into engagement with said circular rack plate.

6. In a glass blowing machine, the combination of a rotary frame, a mold and blow pipe carried thereby, means for rotating said frame, a gear wheel on said frame, a movable frame on said rotary frame, idlers on said movable frame meshing with said gear wheel, a circular rack plate, a crank on said frame, one arm of which engages said movable frame, a cam on the other arm of said crank having double inclined faces, and cam blocks on said circular rack plate, said blocks being staggered with reference to each other, whereby said idlers are moved to alternately mesh with said circular rack plate.

7. In a glass blowing machine, the combination of a rotary frame, a mold and blow pipe carried thereby, means for rotating said frame, a gear wheel on said frame, a movable frame, idlers on said movable frame meshing with said gear wheel, a circular rack plate, a crank, oppositely arranged yielding bearing faces on said movable plate between which one arm of said crank arm rests, and, means carried by said circular plate for oscillating said crank, whereby said idlers are alternately thrown into engagement with said circular rack.

8. In a glass blowing machine, the combination of a rotary frame, a mold and blow pipe carried thereby, means for rotating said frame, a gear wheel on said frame, a movable frame carried by said rotary frame, idlers on said movable frame meshing with said gear wheel, a circular rack plate, oppositely arranged yielding pins on said movable frame, a crank, one arm of which rests between said pins, and means carried by said circular rack plate by which said crank is oscillated and said idlers alternately thrown into engagement with said circular rack.

In testimony whereof, we the said HARRY A. SCHNELBACH and HERMAN A. HEUPEL have hereunto set our hands.

HARRY A. SCHNELBACH.
HERMAN A. HEUPEL.

Witnesses:
L. P. FLICKINGER,
Jos. V. STARK.